(12) United States Patent
Koike et al.

(10) Patent No.: US 8,906,298 B2
(45) Date of Patent: Dec. 9, 2014

(54) METHOD FOR PROTECTING SUBSTRATE

(75) Inventors: Keiji Koike, Toyota (JP); Masayuki Iwasaki, Anjo (JP); Shiro Ogata, Kawasaki (JP); Yoshimitsu Matsui, Takeo (JP)

(73) Assignees: Central Motor Wheel Co., Ltd., Anjo-shi (JP); Sustainable Titania Technology Inc., Tokyo (JP)

( * ) Notice: Subject to any disclaimer, the term of this patent is extended or adjusted under 35 U.S.C. 154(b) by 517 days.

(21) Appl. No.: 12/736,418

(22) PCT Filed: Apr. 10, 2009

(86) PCT No.: PCT/JP2009/057381
§ 371 (c)(1),
(2), (4) Date: Dec. 15, 2010

(87) PCT Pub. No.: WO2009/125846
PCT Pub. Date: Oct. 15, 2009

(65) Prior Publication Data
US 2011/0121634 A1  May 26, 2011

(30) Foreign Application Priority Data
Apr. 11, 2008 (JP) ................. 2008-103736

(51) Int. Cl.
*A61L 2/00* (2006.01)
*B01J 19/00* (2006.01)
*B32B 7/02* (2006.01)

(52) U.S. Cl.
CPC .................................. *B32B 7/02* (2013.01)
USPC ............................................... 422/40; 422/1

(58) Field of Classification Search
USPC .............................................. 422/1, 40
See application file for complete search history.

(56) References Cited

U.S. PATENT DOCUMENTS

| | | | |
|---|---|---|---|
| 4,874,659 A | 10/1989 | Ando et al. | |
| 5,409,544 A * | 4/1995 | Ota et al. | 134/22.14 |
| 2007/0248790 A1* | 10/2007 | Ogata | 428/98 |
| 2009/0267015 A1* | 10/2009 | Ogata | 252/62.3 R |

FOREIGN PATENT DOCUMENTS

| | | |
|---|---|---|
| JP | 61-102476 | 5/1986 |
| JP | 9-262481 | 10/1997 |
| JP | 2000-334229 | 12/2000 |
| JP | 2001-62286 | 3/2001 |
| JP | 2006-95382 | 4/2006 |

(Continued)

OTHER PUBLICATIONS

Machine translation of WO2004041723.*

(Continued)

*Primary Examiner* — Christopher K Vandeusen
(74) *Attorney, Agent, or Firm* — Kenyon & Kenyon LLP

(57) ABSTRACT

The present invention relates to a method for preventing or reducing contamination of a surface of a substrate, or protecting a surface of a substrate by making a surface of a substrate hydrophilic, by means of arranging, successively in relation to the substrate, a first layer containing a negatively-charged substance, and a second layer containing a positively-charged substance or containing a positively-charged substance and a negatively-charged substance on the surface of the substrate or in a surface layer of the substrate. In accordance with the present invention, a novel method for preventing or reducing adhesion of contaminants, and color degradation or color change of a substrate over time, can be provided.

4 Claims, 8 Drawing Sheets

(56) References Cited

FOREIGN PATENT DOCUMENTS

| | | | |
|---|---|---|---|
| JP | 2008-112698 | | 5/2008 |
| WO | WO 02/074451 | | 9/2002 |
| WO | WO2004041723 | * | 5/2004 |
| WO | WO 2007/077712 | | 7/2007 |
| WO | WO 2007/091479 | | 8/2007 |
| WO | WO 2008/013148 | | 1/2008 |

OTHER PUBLICATIONS

Nguyen, et al; "Photocatalytic reduction of selenium ions using different TiO2 photocatalysts," Chemical Engineering Science, 60, 5759-5769 (2005).*

JP Office Action in Application No. JP 2010-507287—Notice of Reasons for Rejection dated Feb. 25, 2014.

* cited by examiner (1)

| | SURFACE PHOTOGRAPHS AFTER BRAKE DUST CONTAMINATION ACCELERATION TEST CORRESPONDING TO 3,200Km | | |
|---|---|---|---|
| | A | B | C |
| WITHOUT HEAT | | | |
| 120°C HEAT | | | |

METHOD FOR PROTECTING SUBSTRATE

The present application claims priority on Japanese Patent Application No. 2008-103736 filed in Japan on Apr. 11, 2008, the entire contents of which are hereby incorporated by reference.

TECHNICAL FIELD

The present invention relates to a method for preventing or reducing contamination of the surface of a substrate, and protecting the surface of a substrate, by imparting positive charges to the surface of the substrate. In particular, the method can prevent a protective function of the surface of the substrate from losing by neutralizing positive charges of the aforementioned surface by means of negative charges generated from the substrate.

BACKGROUND ART

Conventionally, it is known that various colored substrates (such as printed articles, building materials, fibers, organic polymer resin products, and the like) become faded and discolored over time. Factors in such fading and discoloration include photodegradation, adhesion of contaminants to the surface of the substrate, and the like. Various methods have been developed as countermeasures therefor.

For example, in order to prevent photodegradation, a method in which an ultraviolet absorber is mixed in a substrate has been adopted.

Moreover, in order to prevent or remove adhesion of contaminants from the surface of a substrate, a method in which a coating film having an anti-contamination function or a self-cleaning function is formed on the surface of a substrate has been developed. An example of the aforementioned method is a method in which a photocatalytic layer is formed by employing anatase-type titanium oxide, described in Japanese Unexamined Patent Application, First Publication No. H09-262481.

Patent Document 1: Japanese Unexamined Patent Application, First Publication No. H09-262481

DISCLOSURE OF THE INVENTION

Problems to be Solved by the Invention

However, in the case of mixing an ultraviolet absorber in a substrate, the ultraviolet absorber is decomposed by the effects of components included in the substrate, and sufficient ultraviolet absorbing effects cannot be exhibited.

In addition, in the case of imparting a photocatalytic function to the surface of a substrate, the substrate itself may be decomposed and degraded by the photocatalytic effects, depending on the type of substrate. In addition, since the substrate having photocatalytic properties is negatively charged, there is a problem in electrostatically adsorbing contaminants with positive charges.

The present invention has an objective to provide a novel method for preventing or reducing fading or discoloration of a substrate over time, and at the same time, preventing and reducing adhesion of contaminants.

Means for Solving the Problems

The objective of the present invention can be achieved by arranging a first layer containing a positively-charged substance and a second layer containing a positively-charged substance, or a positively-charged substance and a negatively-charged substance, on a surface of a substrate or in a surface layer of the substrate. The aforementioned first layer and the aforementioned second layer are successively arranged on the aforementioned substrate. Therefore, the first layer is arranged between the aforementioned substrate and the aforementioned second layer.

The aforementioned positively-charged substance is preferably at least one substance having positive charges selected from the group consisting of (1) a positive ion; (2) a conductor or dielectric having positive charges; and (3) a composite formed from a conductor having positive charges and a dielectric or a semiconductor. The aforementioned negatively-charged substance is preferably at least one substance having negative charges selected from the group consisting of (4) a negative ion; (5) a conductor or dielectric having negative charges; (6) a composite formed from a conductor having negative charges and a dielectric or a semiconductor, and (7) a substance having photocatalytic function.

An intermediate layer may be formed between the aforementioned substrate and the aforementioned first layer. In addition, a coating layer may be formed on the aforementioned second layer. An arbitrary surface property can be imparted to the substrate by selecting the material function of the aforementioned intermediate layer and the aforementioned coating layer. The aforementioned substrates which are subjected to the surface treatment as described above can be used in various products such as tire wheels for automobiles or the like.

Effects of the Invention

Airborne pollutants and/or contaminants adhered on a substrate are photo-oxidized by means of sunlight or the like, and positive charges are acquired. Even on the surface of a substrate treated with the method according to the present invention, positive charges are present. For this reason, the aforementioned contaminants are electrostatically repelled, and thereby, naturally separated from the surface of the substrate. Therefore, it is possible to self-clean the surface of the substrate.

Also, in the case of presenting negative charges in the second layer, contamination-inducing substances having negative charges such as kaolin clay powders, chloride ions in tap water are electrostatically repelled as well, and thereby the adhesion thereof onto the substrate surface is prevented. Thus, changes in the substrate surface properties due to the adhesion of such impurities are prevented, and the surface of the substrate can be maintained to be clean.

In the present invention, the first layer having negative charges is present between the substrate and the second layer having positive charges. For this reason, even if the substrate has a negatively-charged substance, the charges of the negatively-charged substance produced from the substrate are reversed to positive charges due to the negative charges of the first layer. Thereby, it does not occur that negative charges adhere to the positive charges in the second layer and are neutralized. Therefore, the surface protective function of the second layer is never impaired.

In the case of forming an intermediate layer between the substrate and the first layer, and in the case of forming a coating layer on the second layer, by using a hydrophilic or alternatively hydrophobic, or water-repellent or alternatively oil-repellent intermediate layer and/or coating layer, by means of use of these properties, adhesion of contaminants to the surface of the substrate can be prevented or reduced for a longer period of time.

In addition, the substrate treated with the method of the present invention possesses increased resistance with respect to the effects of sunlight or the like. Therefore, the substrate can be greatly protected from photodegradation caused by sunlight or the like. In addition, the substrate treated with the method according to the present invention can exhibit high resistance to contaminants not only in air but also in water.

In the present invention, due to the aforementioned effects, fading or discoloration of the substrate can be prevented or reduced for a long period of time. Therefore, the present invention is suitably used in surface-treatments of various products exposed to contaminants, such as airplanes; automobiles; electric trains; trains; experimental equipment; machine tools; building materials; and the like. In particular, the present invention can be applied to tire wheels for automobiles exposed to many contaminants outdoors, and contamination of the surface of the aforementioned tire wheels can be prevented for a long period of time.

BRIEF DESCRIPTION OF THE DRAWINGS

FIG. 10 indicates photographs showing test results of Evaluation 3.

BEST MODES FOR CARRYING OUT THE INVENTION

Figure 1:
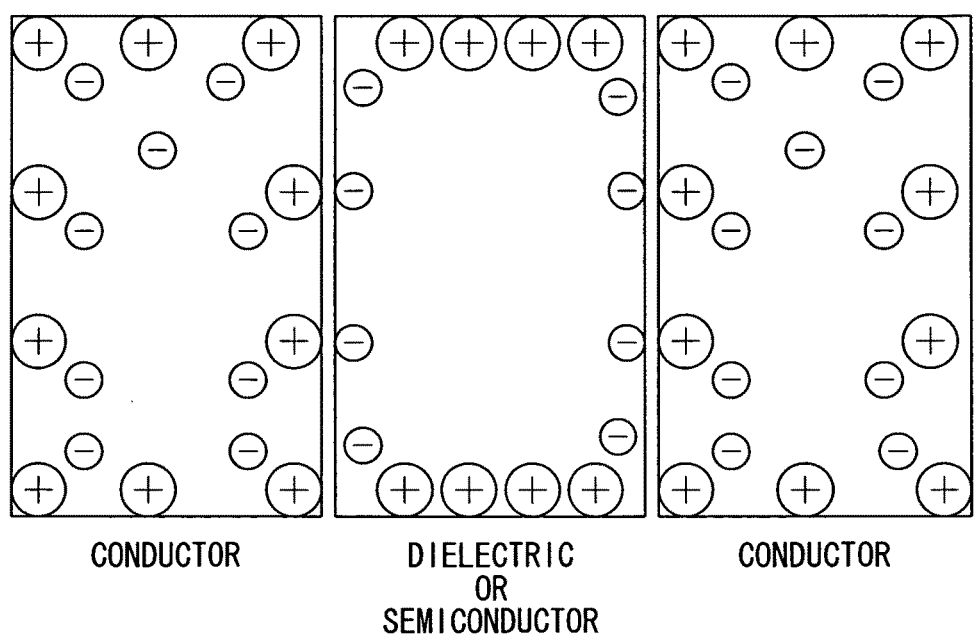
FIG. 1 is a diagram showing a mechanism of imparting positive charges employed in the present invention.

The present invention is characterized by preventing or reducing contamination of the surface of a substrate, or making the surface of a substrate hydrophilic to protect the surface of the substrate, by arranging a first layer containing a negatively-charged substance and a second layer containing a positively-charged substance or a positively-charged substance and a negatively-charged substance, successively on the surface of the substrate or in a substrate surface layer.

The substrate of the present invention is not particularly limited. Various hydrophilic or hydrophobic inorganic substrates and organic substrates or combinations thereof can be employed.

Examples of an inorganic substrate include, for example, substrates formed from substances of transparent or opaque glass such as soda lime glass or the like, metal oxides such as zirconia or the like, ceramics, concrete, mortar, stone, metals or the like. In addition, examples of an organic substrate include, for example, substrates formed from substances such as organic resins, wood, paper, or the like. As detailed examples of the organic resins, mention may be made of, for example, polyethylene, polypropylene, polycarbonate, acrylic resins, polyester such as PET or the like, polyamide, polyurethane, ABS resins, polyvinyl chloride, silicone, melamine resins, urea resins, silicone resins, fluorine resins, cellulose, epoxy-modified resins, or the like.

The shape of the substrate is not particularly limited, and any shape such as cubes, cuboids, spheres, sheets, fibers, or the like can be employed. In addition, the substrate may be porous. The surface of the substrate may be subjected to a hydrophilic treatment such as a corona discharge treatment, a UV exposure treatment, or the like. As examples of the substrate, mention may be made of, for example, bodies for various devices or equipment, and display screens, in addition to airplanes, automobiles, trains, electric trains, experimental equipment, machine tools, building materials, sealing materials, tire wheels for automobiles, and the like.

The first layer arranged on the surface of the substrate or in a surface layer of the substrate contains a negatively-charged substance. As examples of the negatively-charged substance, mention may be made of, for example, a negative ion; a conductor or dielectric having negative charges; a composite formed from a conductor having negative charges and a dielectric or a semiconductor; and a substance having photocatalytic function.

The aforementioned negative ion is not particularly restricted. As examples of the negative ion, mention may be made of, for example, a halogenide ion such as a fluoride ion, a chloride ion, an iodide ion or the like; an inorganic ion such as a hydroxide ion, a sulfate ion, a nitrate ion, a carbonate ion or the like; and an organic ion such as an acetate ion or the like. The valency of the ion is not particularly restricted. For example, a monovalent to tetravalent negative ion can be employed.

As the conductor or dielectric having negative charges, mention may be made of conductors or dielectrics in which negative charges, other than the aforementioned negative ions, are generated. As examples thereof, mention may be made of, for example, negative electrodes of batteries, formed from various conductors as described below, and dielectrics such as Teflon, vinyl chloride, polyethylene, polyester, or the like, which are negatively charged.

In the present invention, the second layer containing a positively-charged substance is arranged on the aforementioned first layer.

With respect to contaminants which cause fading or discoloration of the surface of a substrate, inorganic substances such as airborne carbons and/or organic substances such as oils are gradually deposited on the surface of the substrate, and thereby, they adhere to the surface of the substrate.

In the present invention, the aforementioned contaminants can be removed from the substrate, or adhesion of these contaminants to the substrate can be prevented or reduced by means of electrostatic repulsion provided by the second layer.

It is believed that mainly outdoor airborne contaminants, and in particular, oil components, are subjected to a so-called photooxidation reaction due to various types of electromagnetic radiation such as sunlight and the like, and are in an "oxidized" state.

The photooxidation reaction refers to a phenomenon in which, when hydroxyl radicals (.OH) or singlet oxygen ($^1O_2$) are produced from oxygen ($O_2$) or moisture ($H_2O$) on the surface of an organic product or an inorganic product due to the effects of electromagnetic radiation such as sunlight or the like, electrons ($e^-$) are withdrawn from the aforementioned organic or inorganic product to thereby oxidize it. Due to the aforementioned oxidation, in the organic product, the molecular structure changes, so that discoloration or embrittlement which is referred to as deterioration is observed; in the inorganic product, and in particular, a metal, rust occurs. The surface of the "oxidized" organic product or inorganic product is thus positively charged by the withdrawal of electrons ($e^-$).

In the present invention, by imparting positive charges to the second layer on the substrate, the aforementioned organic product or inorganic product is naturally withdrawn from the surface of the substrate by means of electrostatic repulsion. As a method for imparting positive charges to the second layer, mention may be made of, for example, a method in which a positively-charged substance selected from the group consisting of a positive ion, a conductor or dielectric having positive charges, a composite formed from a conductor having positive charges and a dielectric or a semiconductor, and a mixture thereof is employed as the second layer.

The aforementioned positive ion is not particularly restricted. As the positive ion, an ion of an alkali metal such as sodium, potassium or the like; an ion of an alkaline earth metal such as calcium or the like; and an ion of another metal element such as aluminum, cesium, indium, cerium, selenium, chromium, cobalt, nickel, antimony, iron, copper, manganese, tungsten, zirconium, zinc, or the like, are preferable. In particular, a copper ion is preferable. In addition, a cationic dye such as methyl violet, Bismarck brown, methylene blue, malachite green or the like, or an organic molecule having a cationic group such as a silicone modified with a quaternary nitrogen atom-containing group or the like can also be employed. The valency of the ion is not particularly restricted. For example, a monovalent to tetravalent positive ion can be employed.

As a supply source of the aforementioned metal ion, a metal salt can also be employed. Examples thereof include various metal salts such as aluminum chloride, chromium chloride, nickel chloride, antimony (III) chloride, antimony (V) chloride, iron (II) chloride, iron (III) chloride, cesium chloride, indium (III) chloride, cerium (III) chloride, selenium tetrachloride, copper (II) chloride, manganese chloride, tungsten tetrachloride, tungsten oxydichloride, potassium tungstate, zirconium oxychloride, zinc chloride, barium carbonate, and the like. In addition, a metal hydroxide such as aluminum hydroxide, iron hydroxide, chromium hydroxide, indium hydroxide or the like; a hydroxide such as tungstosilicic acid or the like; an oxide such as a fat oxide or the like, and the like can also be employed.

Examples of the conductor or dielectric having positive charges include conductors or dielectrics in which positive charges are generated, other than the aforementioned positive ions. As examples thereof, mention may be made of, for example, positive electrodes of batteries, formed from various conductors as described below, and dielectrics such as wool, nylon, and the like which are positively charged by friction.

The principle of imparting positive charges with a composite of a conductor and a dielectric or semiconductor is shown in FIG. 1. FIG. 1 is a diagram in which a combination of (a conductor)-(a dielectric or a semiconductor)-(a conductor) is arranged as the second layer. The conductor can have a positively charged state on the surface due to the presence of free electrons at a high concentration in which electrons can be freely moved inside thereof. In addition, as the conductor, a conductive substance containing positive ions can also be employed. On the other hand, the dielectric or semiconductor adjacent to the conductors is subjected to charge polarization by the effects of the charge conditions on the surface of the conductor. As a result, at the side of the dielectric or semiconductor adjacent to the conductor, negative charges are produced, while at the side of the dielectric or semiconductor which is not adjacent to the conductor, positive charges are produced. Due to the aforementioned effects, the surface of the combination of (a conductor)-(a dielectric or a semiconductor)-(a conductor) is positively charged, and positive charges are provided on the second layer.

Figure 2:
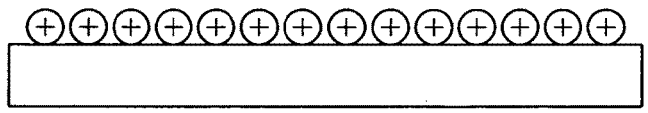
FIG. 2 is a diagram showing a mechanism of removing contaminants from the surface of a substrate which carries positive charges.
Figure 2:
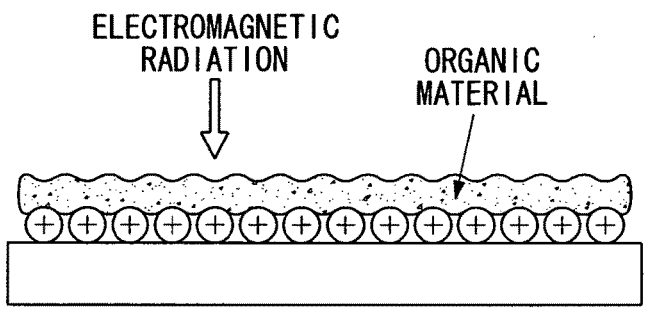
Figure 2:
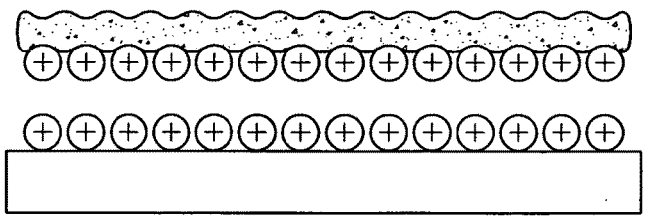
Figure 2:
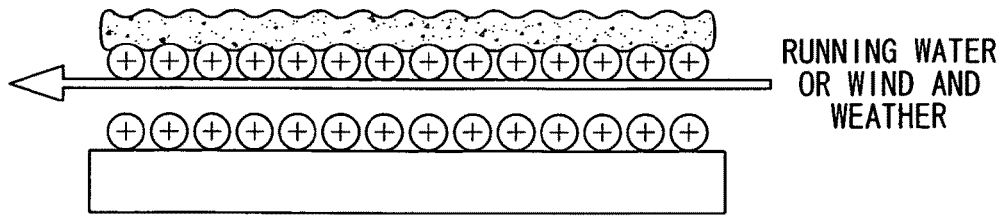

Next, a mechanism of removal of contaminants from the surface of the second layer which is positively charged is shown in FIG. 2. In FIG. 2, the first layer is not shown.

In the mode shown in FIG. 2, by arranging a positive ion; a conductor or dielectric having positive charges; a composite formed from a conductor having positive charges and a dielectric or a semiconductor; or a mixture thereof, as the second layer, the second layer is positively charged (FIG. 2 (1)).

Contaminants are deposited on the surface of the second layer, and then photooxidized by means of the effects of electromagnetic radiation such as sunlight or the like. Thereby, the contaminants are also positively charged (FIG. 2 (2)).

Electrostatic repulsion of positive charges between the surface of the second layer and the contaminants is produced, and a repulsion force acts on the contaminants. Thereby, the fixing power of the contaminants to the surface of the second layer is reduced (FIG. 2 (3)).

By means of physical effects such as wind and weather, the contaminants are easily removed from the second layer (FIG. 2 (4)). Thereby, the substrate can be self-cleaned.

By means of positively charging the second layer, as described above, adhesion of the contaminants positively charged to the surface of the substrate can be prevented. However, on the other hand, among contaminants, there are contaminants negatively charged such as chloride ions in tap water or the like, contaminants which initially possess positive charges, but are then negatively charged by means of interaction with other products (friction or the like), and the like. The aforementioned contaminants negatively charged are easily adsorbed on the surface of the substrate which is completely positively-charged. Therefore, the second layer may possess both positive charges and negative charges. Thereby, adhesion of the negatively-charged contaminants on the surface of the substrate can be prevented.

In addition, in the case of contaminants composed of insulators having relatively reduced amounts of positive charges or negative charges (such as silicone oil), depending on the types of the aforementioned contaminants, when only strong positive or negative charges are present on the surface of the substrate, the surface charge of the aforementioned contaminants is reversed. As a result, the aforementioned contaminants may be adhered to the surface of the aforementioned substrate. For this reason, by coexisting both positive and negative charges, the aforementioned adhesion can be prevented.

As a method for providing negative charges to the second layer, mention may be made of, for example, a method in which a negatively-charged substance selected from a negative ion; a conductor or dielectric having negative charges; a composite formed from a conductor having negative charges and a dielectric or a semiconductor; a substance having a photocatalytic function; and a mixture thereof, is blended in the second layer.

As a substance having photocatalytic function, a substance containing a specific metal compound and having a function of oxidizing and decomposing the organic and/or inorganic compounds on the surface of a substrate due to photoexcitation may be used. It is generally believed that the photocatalytic principle is that a specific metal compound produces radical species such as OH⁻ or $O_2^-$ from oxygen or moisture in the air by means of photoexcitation, and the aforementioned radical species oxidize/reduce-decompose the organic and/or inorganic compounds.

As the aforementioned metal compound, in addition to representative titanium oxide ($TiO_2$), ZnO, $SrTiOP_3$, CdS, CdO, CaP, InP, $In_2O_3$, CaAs, $BaTiO_3$, $K_2NbO_3$, $Fe_2O_3$, $Ta_2O_5$, $WO_3$, NiO, $Cu_2O$, SiC, $SiO_2$, $MoS_3$, InSb, $RuO_2$, $CeO_2$, and the like are known.

The substance having a photocatalytic function may comprise a metal for improving photocatalytic effects (such as Ag or Pt). In addition, various substances such as metal salts or the like can be added within a range which does not deactivate the photocatalytic functions. As examples of the aforementioned metal salts, mention may be made of salts of metals such as aluminum, tin, chromium, nickel, antimony, iron, silver, cesium, indium, cerium, selenium, copper, manganese, calcium, platinum, tungsten, zirconium, zinc, or the like. In addition thereto, as some metals or non-metals, hydroxides or oxides thereof can also be employed. More particularly, examples thereof include various metal salts such as aluminum chloride, tin (II) chloride, tin (IV) chloride, chromium chloride, nickel chloride, antimony (III) chloride, antimony (V) chloride, iron (II) chloride, iron (III) chloride, silver nitrate, cesium chloride, indium (III) chloride, cerium (III) chloride, selenium tetrachloride, copper (II) chloride, manganese chloride, calcium chloride, platinum (II) chloride, tungsten tetrachloride, tungsten oxydichloride, potassium tungstate, gold chloride, zirconium oxychloride, zinc chloride, or the like. In addition, as compounds other than the metal salts, mention may be made of indium hydroxide, silicotungstic acid, silica sol, calcium hydroxide, or the like.

The aforementioned substance having a photocatalytic function adsorbs, when excited, OH⁻ (hydroxide radical) or $O_2^-$ (oxygenation radical) from adsorbed water and oxygen on the surface of a substance, and therefore, it has negative charges on its surface. If a positively-charged substance coexists therein, the photocatalytic function will be reduced or lost, depending on the concentration of the positive charges. However, in the present invention, the substance having a photocatalytic function does not need to exert oxidation decomposition effects on contaminants, and it can be used as a negatively-charged substance.

Figure 3:
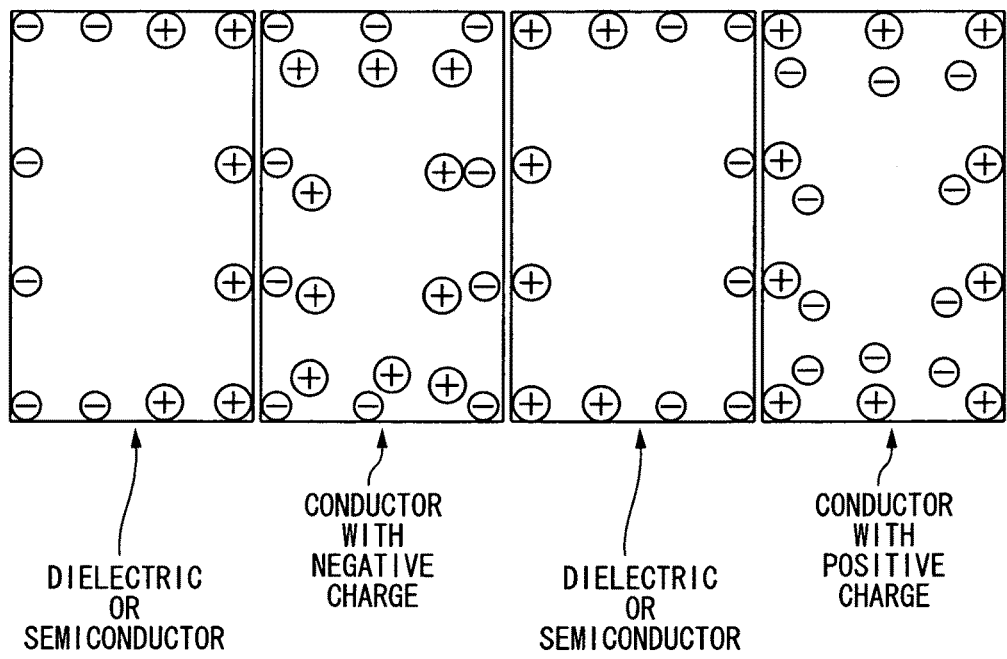
FIG. 3 is a diagram showing a mechanism of imparting positive charges and negative charges employed in the present invention.

FIG. 3 is a diagram showing one of the modes of imparting both positive charges and negative charges to the second layer, in which a combination of (a dielectric or a semiconductor)-(a conductor having negative charges)-(a dielectric or a semiconductor)-(a conductor having positive charges) is used as the second layer. As the conductor having negative charges and the conductor having positive charges shown in FIG. 3, those described above can be used.

As shown in FIG. 3, the dielectric or semiconductor adjacent to the conductor having negative charges is subjected to charge polarization by the effects of the charge conditions on the surface of the conductor. As a result, at the side of the dielectric or semiconductor adjacent to the conductor having negative charges, positive charges are produced, while at the side of the dielectric or semiconductor which is adjacent to the conductor having positive charges, negative charges are produced. Due to the aforementioned effects, the surface of the combination of (a dielectric or a semiconductor)-(a conductor)-(a dielectric or a semiconductor)-(a conductor) shown in FIG. 3 is positively or negatively charged. The size of the aforementioned composite (which means the length of the longest axis passing through the composite) of the conductor and the dielectric or semiconductor can range from 1 nm to 100 µm, and preferably ranges from 1 nm to 10 µm, more preferably ranges from 1 nm to 1 µm, and particularly preferably ranges from 1 nm to 100 nm.

Figure 4:
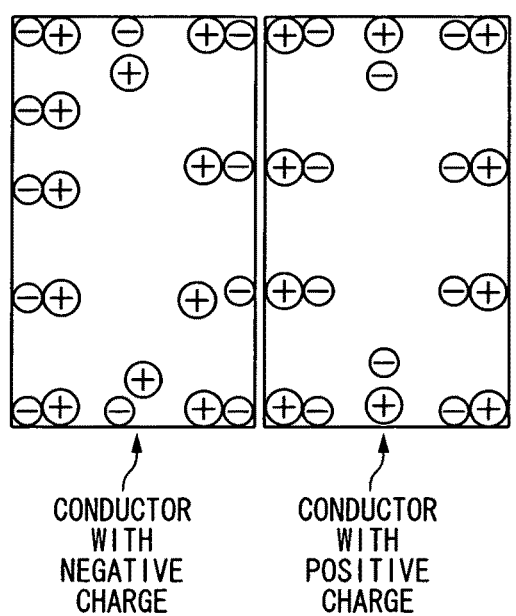
FIG. 4 is a diagram-showing another mechanism of imparting positive charges and negative charges employed in the present invention.

FIG. 4 is a diagram showing another mode of imparting positive charges and negative charges to the second layer.

In FIG. 4, a conductor having negative charges is adjacent to a conductor having positive charges, and the amount of the positive charges and negative charges is reduced due to contact disappearance or the like. As the conductor having negative charges and the conductor having positive charges, those described above can be used.

Figure 5:
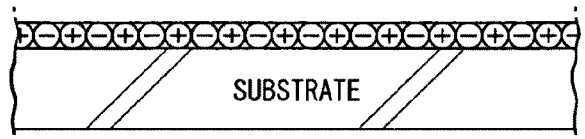
FIG. 5 is a diagram showing a mechanism of removing contaminants from the surface of a substrate which carries positive charges and negative charges.
Figure 5:
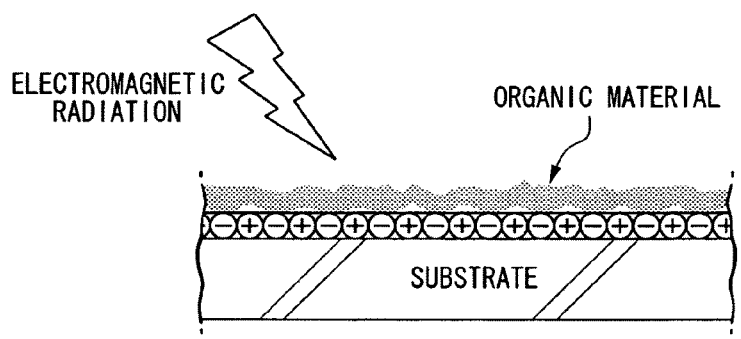
Figure 5:
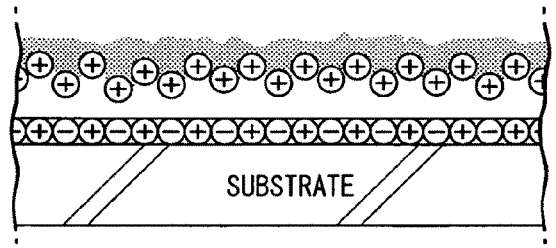
Figure 5:
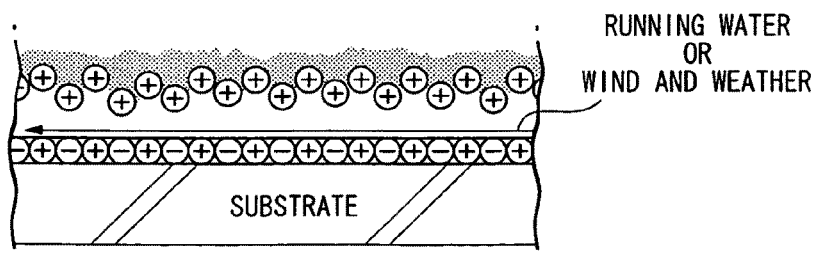

Next, a mechanism of removal of contaminants from the surface of the second layer which is positively and negatively charged is shown in FIG. 5. In FIG. 5, the first layer is not shown.

In the aforementioned mode, by arranging a negatively-charged substance selected from a negative ion; a conductor or dielectric having negative charges; a composite formed from a conductor having negative charges and a dielectric or a semiconductor; a substance having photocatalytic function; and the mixture thereof, as the second layer, the second layer is positively and negatively charged (FIG. 5 (1)).

Contaminants are deposited on the surface of the second layer, followed by photooxidizing them by means of the effects of electromagnetic radiation such as sunlight or the like. Thereby, the contaminants are also positively charged (FIG. 5 (2)).

Electrostatic repulsion of positive charges between the surface of the second layer and the contaminants is produced, and a repulsion force acts on the contaminants. Thereby, the fixing power of the contaminants to the surface of the second layer is reduced (FIG. 5 (3)).

By means of physical effects such as wind and weather, the contaminants are easily removed from the second layer (FIG. 5 (4)). Thereby, the substrate can be self-cleaned.

Since there are negative charges as well on the surface of the second layer, contaminants or contaminant-inducing substances having negative charges such as kaolin clay powder, chloride ions or the like can also be repelled and the fixing power thereof to the surface of the second layer is reduced.

The conductor employed in the present invention is preferably a metal in view of durability. Examples thereof include metals such as aluminum, tin, cesium, indium, cerium, selenium, chromium, nickel, antimony, iron, silver, copper, manganese, platinum, tungsten, zirconium, zinc, or the like. In addition, a composite or alloy of the aforementioned metals can also be employed. The shape of the conductor is not particularly restricted. The conductor may be in any shape such as particles, flakes, fibers, or the like.

As the conductor, a metal salt of a certain metal can also be employed. Examples thereof include various metal salts such as aluminum chloride, tin (II) chloride, tin (IV) chloride, chromium chloride, nickel chloride, antimony (III) chloride, antimony (V) chloride, iron (II) chloride, iron (III) chloride, silver nitrate, cesium chloride, indium (III) chloride, cerium (III) chloride, selenium tetrachloride, copper (II) chloride, manganese chloride, platinum (II) chloride, tungsten tetrachloride, tungsten oxydichloride, potassium tungstate, gold chloride, zirconium oxychloride, zinc chloride, and the like. In addition, a hydroxide or oxide such as that of tungstosilicic acid indium hydroxide or the like can also be employed.

As the conductor, a conductive polymer such as polyaniline, polypyrrol, polythiophene, polythiophene vinylon, polyisothianaphthene, polyacetylene, polyalkyl pyrrol, polyalkyl thiophene, poly-p-phenylene, polyphenylene vinylon, polymethoxyphenylene, polyphenylene sulfide, polyphenylene oxide, polyanthrathene, polynaphthalene, polypyrene, polyazulene, or the like can also be employed.

As the semiconductor for the composite employed in the present invention, for example, C, Si, Ge, Sn, GaAs, Inp, GeN, ZnSe, PbSnTe, or the like, can be employed, and a semiconductor metal oxide, a photosemiconductor metal, or a photosemiconductor metal oxide can also be employed. Preferably, in addition to titanium oxide ($TiO_2$), ZnO, $SrTiOP_3$, CdS, CdO, CaP, InP, $In_2O_3$, CaAs, $BaTiO_3$, $K_2NbO_3$, $Fe_2O_3$, $Ta_2O_3$, $WO_3$, NiO, $Cu_2O$, SiC, $SiO_2$, $MoS_3$, InSb, $RuO_2$, $CeO_2$, or the like can be employed. A compound in which the photocatalytic effects are inactivated by Na or the like is preferable if used as the semiconductor.

As the dielectric for the composite employed in the present invention, barium titanate (PZT), which is a strong dielectric, so-called SBT, BLT, or a composite metal such as PZT, PLZT-(Pb,La) (Zr,Ti)$O_3$, SBT, SBTN—$SrBi_2(Ta,Nb)_2O_9$, BST-(Ba,Sr)$TiO_3$, LSCO-(La,Sr)$CoO_3$, BLT, BIT-(Bi,La)$_4Ti_3O_{12}$, BSO—$Bi_2SiO_5$, or the like can be employed. In addition, various weak dielectric materials such as a silane compound, a silicone compound, or a so-called organomodified silica compound, which is an organic silicon compound, or an organic polymer insulating film allylene ether-based polymer, benzocyclobutene, a fluorine-based polymer parylene N or F, a fluorinated amorphous carbon, or the like can also be employed.

As the composite formed from the conductor having positive charges or negative charges and the dielectric or semiconductor, any combinations of the conductors and the dielectrics or the semiconductors can be employed as long as the composites can impart positive charges and negative charges on the surface of the substrate. In view of the self-cleaning properties of the surface of the substrate, a metal-doped titanium oxide is preferably employed. As the aforementioned metal, at least one metal element selected from the group consisting of gold, silver, platinum, copper, zirconium, tin, manganese, nickel, cobalt, iron, and zinc can be employed. At least two of these are preferable. In particular, silver or tin, as well as copper or iron are preferable. As a titanium oxide, various oxides and peroxides such as $TiO_2$, $TiO_3$, TiO, $TiO_3/nH_2O$, and the like can be employed. In particular, titanium peroxide having a peroxy group is preferable. The titanium oxide may be amorphous-type, anatase-type, brookite-type, or rutile-type. These types may be mixed. Amorphous-type titanium oxide is preferable.

Amorphous-type titanium oxide does not have photocatalytic effects. In contrast, anatase-type, brookite-type, and rutile-type titanium oxides exhibit photocatalytic effects, but if copper, manganese, nickel, cobalt, iron or zinc, at a certain concentration or more, is compounded therewith, the aforementioned photocatalytic effects are lost. Therefore, the aforementioned metal-doped titanium oxides exhibit no photocatalytic effects. Amorphous-type titanium oxide can be converted into anatase-type titanium oxide over time by means of heating by sunlight, or the like. However, when copper, zirconium, tin, manganese, nickel, cobalt, iron or zinc is compounded therewith, the aforementioned photocatalytic effects of the anatase-type titanium oxide are lost. As a result, the aforementioned metal-doped titanium oxide exhibits no photocatalytic effects over time. On the other hand, titanium oxides in which gold, silver or platinum is doped show photocatalytic properties when the titanium oxides are converted from amorphous-type to anatase-type. However, when a certain amount or more of the positively-charged substance coexists therewithin, photocatalytic properties are not exhibited. Thus, the aforementioned metal-doped titanium oxides exhibit no photocatalytic effects over time.

As a method for manufacturing the aforementioned metal-doped titanium oxide forming a positively- or negatively-charged layer, a manufacturing method based on a hydrochloric acid method or sulfuric acid method which is a general method for manufacturing titanium dioxide powders may be employed, or a manufacturing method using any of various liquid-dispersed titania solutions may be employed. The aforementioned metal can form a composite with titanium oxide in any step of the manufacturing method.

For example, examples of a method for manufacturing the aforementioned metal-doped titanium oxide include the first to third manufacturing methods described below, and a sol-gel method which is conventionally known.

First Manufacturing Method

First, a compound of tetravalent titanium such as titanium tetrachloride or the like and a base such as ammonia or the like are reacted together to form titanium hydroxide. Subsequently, the aforementioned titanium hydroxide is peroxidized with an oxidizing agent to form ultra-fine particles of amorphous-type titanium peroxide. The aforementioned reaction is preferably carried out in an aqueous medium. In addition, if a heating treatment is further carried out, the amorphous-type titanium peroxide can be converted into anatase-type titanium peroxide. In one of the aforementioned steps, at least one of gold, silver, platinum, tin, copper, zirconium, manganese, nickel, cobalt, iron, zinc, and compounds thereof is mixed therein.

The oxidizing agent for use in peroxidation is not particularly restricted. Various oxidizing agents can be employed as long as a peroxide of titanium, that is, titanium peroxide, can be produced. Hydrogen peroxide is preferable. In the case of employing an aqueous solution of hydrogen peroxide as an oxidizing agent, the concentration of hydrogen peroxide is not particularly limited. A concentration thereof ranging from 30 to 40% is preferable. Before the peroxidation reaction is carried out, the titanium hydroxide is preferably cooled. The cooling temperature preferably ranges from 1 to 5° C.

Figure 6:
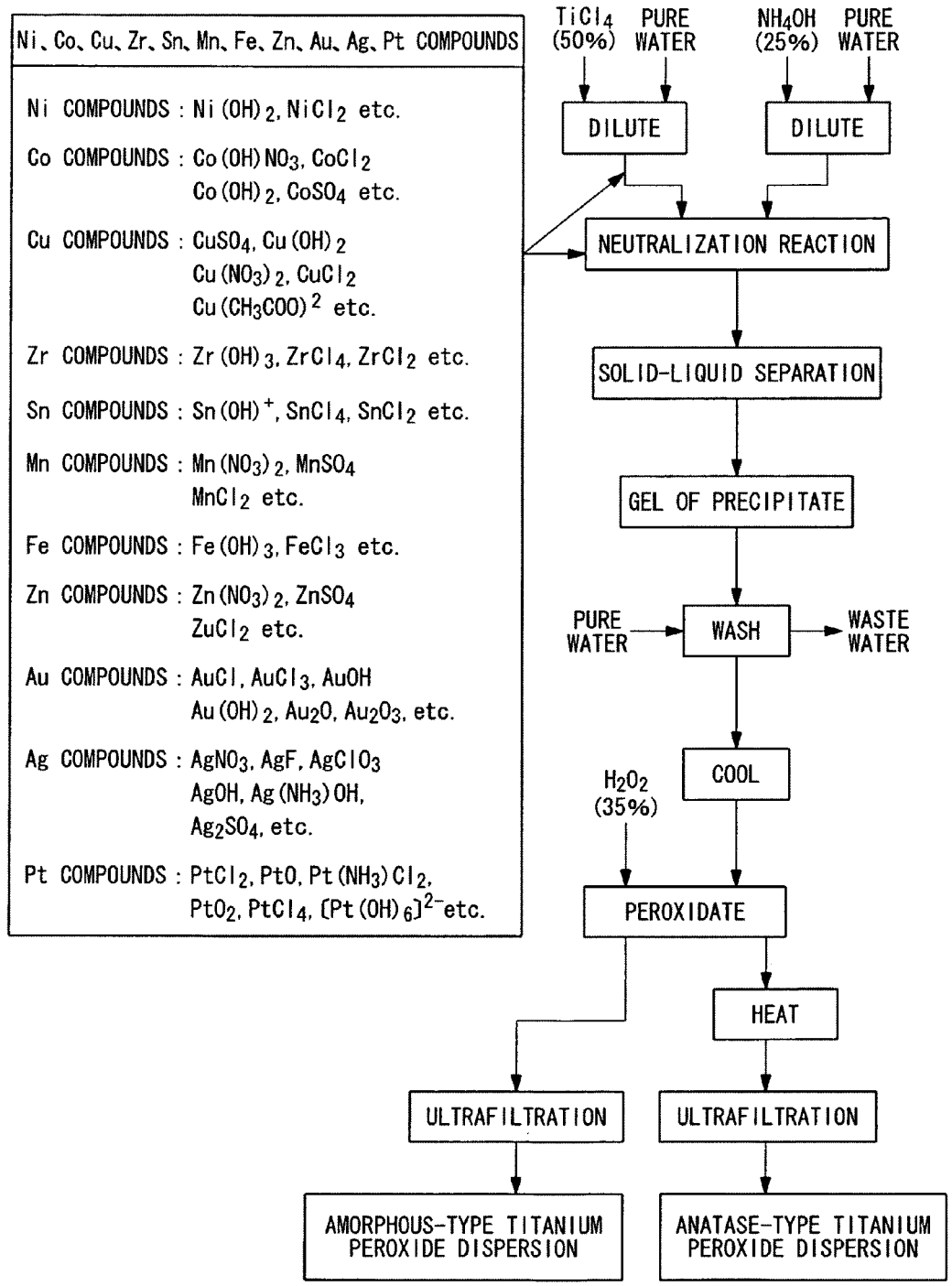
FIG. 6 is a drawing showing an outline of an example of a first method for manufacturing a metal-doped titanium oxide.

One example of the aforementioned first manufacturing method is shown in FIG. 6. In the manufacturing method shown therein, an aqueous solution of titanium tetrachloride and aqueous ammonia are mixed together in the presence of at least one of the compounds of gold, silver, platinum, copper, zirconium, tin, manganese, nickel, cobalt, iron, and zinc, and thereby, a mixture of a hydroxide of the aforementioned metal and a hydroxide of titanium is produced. Here, there are no particular limitations on the concentration or temperature of the reaction mixture, but the reaction is preferably carried out in a dilute solution at room temperature. The aforementioned reaction is a neutralization reaction, and therefore, it is preferable to finally adjust the pH of the reaction mixture to approximately 7.

The hydroxides of the metal and titanium obtained above are washed with pure water, followed by cooling to approximately 5° C. Subsequently, the hydroxides are peroxidized with an aqueous solution of hydrogen peroxide. Thereby, an aqueous dispersion containing fine particles of amorphous-type titanium oxide having a peroxy group which is doped with a metal, i.e., an aqueous dispersion containing a metal-doped titanium oxide, can be produced.

Second Manufacturing Method

A compound of tetravalent titanium such as titanium tetrachloride or the like is peroxidized with an oxidizing agent, and the peroxidized product is reacted with a base such as ammonia or the like to form ultra-fine particles of amorphous-type titanium peroxide. The aforementioned reaction is preferably carried out in an aqueous medium. In addition, optionally by further carrying out a heating treatment, the amorphous-type titanium peroxide can also be converted into anatase-type titanium peroxide. In one of the aforementioned steps, for example, at least one of gold, silver, platinum, copper, zirconium, tin, manganese, nickel, cobalt, iron, zinc, and compounds thereof is mixed therein as a metal element having positive charges or negative charges.

Third Manufacturing Method

A compound of tetravalent titanium such as titanium tetrachloride or the like is reacted together with an oxidizing agent and a base to carry out formation of titanium hydroxide and peroxidation thereof at the same time, and thereby, ultra-fine particles of amorphous-type titanium peroxide are formed. The aforementioned reaction is preferably carried out in an aqueous medium. In addition, by further carrying out a heating treatment, the amorphous-type titanium peroxide can also be converted into anatase-type titanium peroxide. In one of the aforementioned steps, for example, at least one of gold, silver, platinum, copper, zirconium, tin, manganese, nickel, cobalt, iron, zinc, and compounds thereof is mixed therein, as a metal element having positive charges or negative charges.

Needless to say, in the first to third manufacturing methods, a mixture of the amorphous-type titanium peroxide and the anatase-type titanium peroxide obtained by heating the aforementioned amorphous-type titanium peroxide can be employed as a metal-doped titanium oxide.

Manufacturing Method Using Sol-Gel Method

A solvent such as water, an alcohol, or the like, and an acid or base catalyst are mixed and stirred with a titanium alkoxide to hydrolyze the titanium alkoxide. As a result, a sol solution of ultra-fine particles of titanium oxide is produced. Before or after the aforementioned hydrolysis step, at least one of gold, silver, platinum, copper, zirconium, tin, manganese, nickel, cobalt, iron, zinc, and compounds thereof is mixed therein, as a metal element having positive charges or negative charges. The titanium oxide obtained above is an amorphous-type titanium oxide having a peroxy group.

As the aforementioned titanium alkoxide, a compound represented by the general formula: $Ti(OR')_4$, wherein R' is an alkyl group, or a compound in which one or two of the alkoxide groups (OR') in the aforementioned general formula have been substituted with carboxyl groups or beta-dicarbonyl groups, or a mixture thereof is preferable.

Specific examples of the aforementioned titanium alkoxide include $Ti(O\text{-}iso\text{-}C_3H_7)_4$, $Ti(O\text{-}n\text{-}C_4H_9)_4$, $Ti(O\text{---}CH_2CH(C_2H_5)C_4H_9)_4$, $Ti(O\text{---}C_{17}H_{35})_4$, $Ti(O\text{-}iso\text{-}C_3H_7)_2[CO(CH_3)CHCOCH_3]_2$, $Ti(O\text{-}n\text{-}C_4H_9)_2[OC_2H_4N(C_2H_4OH)_2]_2$, $Ti(OH)_2[OCH(CH_3)COOH]_2$, $Ti(OCH_2CH(C_2H_5)CH(OH)C_3H_7)_4$, and $Ti(O\text{-}n\text{-}C_4H_9)_2(OCOC_{17}H_{35})$, and the like.

Compound of Tetravalent Titanium

As the compound of tetravalent titanium employed in the manufacture of the metal-doped titanium oxide, various titanium compounds can be employed as long as titanium hydroxide, also known as ortho-titanic acid ($H_4TiO_4$), can be formed upon reacting with a base. Examples thereof include titanium salts of water-soluble inorganic acids such as titanium tetrachloride, titanium sulfate, titanium nitrate, titanium phosphate, and the like. Other examples include titanium salts of water-soluble organic acids such as titanium oxalate, and the like. Among the various titanium compounds described above, titanium tetrachloride is preferable since superior water solubility is exhibited, and there are no remaining components other than titanium in the dispersion of a metal-doped titanium oxide.

In addition, in the case of employing a solution of a compound of tetravalent titanium, the concentration of the aforementioned solution is not particularly limited as long as a gel of titanium hydroxide can be formed, but a relatively dilute solution is preferable. Specifically, the concentration of the compound of tetravalent titanium preferably ranges from 5 to 0.01% by weight, and more preferably ranges from 0.9 to 0.3% by weight.

Base

As a base to be reacted with the aforementioned compound of tetravalent titanium, various bases can be employed as long as titanium hydroxide can be formed by reacting with the compound of tetravalent titanium. Examples thereof include ammonia, sodium hydroxide, sodium carbonate, potassium hydroxide, or the like. Ammonia is preferable.

In addition, in the case of employing a solution of the aforementioned base, the concentration of the aforementioned solution is not particularly limited as long as a gel of titanium hydroxide can be formed, but a relatively dilute solution is preferable. Specifically, the concentration of the basic solution preferably ranges from 10 to 0.01% by weight, and more preferably ranges from 1.0 to 0.1% by weight. In particular, in the case of employing aqueous ammonia as the basic solution, the concentration of ammonia preferably ranges from 10 to 0.01% by weight, and more preferably ranges from 1.0 to 0.1% by weight.

Metal Compound

As examples of compounds of gold, silver, platinum, copper, zirconium, tin, manganese, nickel, cobalt, iron, or zinc, mention may be made of the compounds described below.

Au compounds: $AuCl$, $AuCl_3$, $AuOH$, $Au(OH)_2$, $Au_2O$, $Au_2O_3$

Ag compounds: $AgNO_3$, $AgF$, $AgClO_3$, $AgOH$, $Ag(NH_3)OH$, $Ag_2SO_4$

Pt compounds: $PtCl_2$, $PtO$, $Pt(NH_3)Cl_2$, $PtO_2$, $PtCl_4$, $[Pt(OH)_6]^{2-}$ Ni compounds: $Ni(OH)_2$, $NiCl_2$ Co compounds: $Co(OH)NO_3$, $Co(OH)_2$, $CoSO_4$, $CoCl_2$ Cu compounds: $Cu(OH)_2$, $Cu(NO_3)_2$, $CuSO_4$, $CuCl_2$, $Cu(CH_3COO)_2$ Zr compounds: $Zr(OH)_3$, $ZrCl_2$, $ZrCl_4$ Sn compounds: $SnCl_2$, $SnCl_4$, $[Sn(OH)]^+$ Mn compounds: $MnNO_3$, $MnSO_4$, $MnCl_2$ Fe compounds: $Fe(OH)_2$, $Fe(OH)_3$, $FeCl_3$ Zn compounds: $Zn(NO_3)_2$, $ZnSO_4$, $ZuCl_2$ The concentration of titanium peroxide in the aqueous dispersion obtained in accordance with the first to third manufacturing methods (the total amount including coexisting gold, silver, platinum, copper, zirconium, tin, manganese, nickel, cobalt, iron and/or zinc) preferably ranges from 0.05 to 15% by weight, and more preferably ranges from 0.1 to 5% by weight. In addition, regarding the content of the metal element having positive charges or negative charges such as gold, silver, platinum, copper, zirconium, tin, manganese, nickel, cobalt, iron, and/or zinc, the molar ratio of titanium and the aforementioned metal component is preferably 1:1 in the present invention. In view of stability of the aqueous dispersion, the ratio preferably ranges from 1:0.01 to 1:0.5, and more preferably ranges from 1:0.03 to 1:0.1.

Figure 7A:
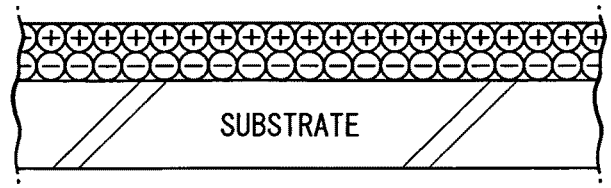
FIG. 7 is a drawing showing various modes of arrangements of a first layer and a second layer on a substrate.
Figure 7B:
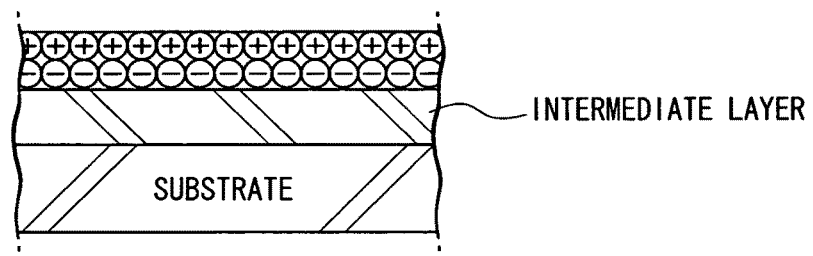
Figure 7C:
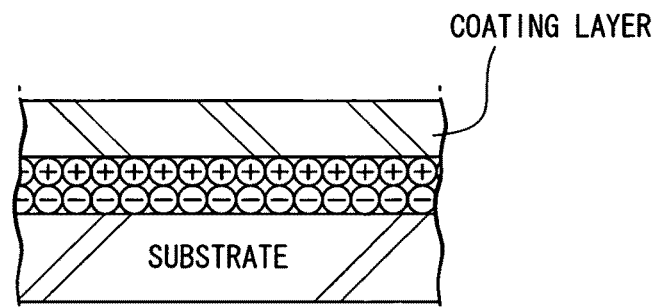

FIG. 7 shows some modes of arranging the first layer and the second layer on the substrate. In the modes shown in FIG. 7, the second layer contains only a positively-charged substance. However, the second layer may contain a positively-charged substance together with a negatively-charged substance.

FIG. 7 (a) shows a mode in which the first layer is directly formed on the surface of the substrate. The thickness of the first layer or the thickness of the second layer is not limited, but is preferably in the range of 10 nm to 1 μm, and more preferably in the range of 10 nm to 100 nm.

The arrangement of the first layer and the second layer shown in FIG. 7 (a) can be formed by, for example, sputtering, thermal spraying, ion plating (cathodic arc discharge mode), CVD coating, electrodeposition coating, or common spray coating.

A step of immersing the substrate in a solution, suspension or emulsion of the aforementioned negatively-charged substance to carry out dip coating, or alternatively, applying the aforementioned solution, suspension or emulsion to the substrate by means of a spray, a roll, a brush, a sponge or the like, followed by drying to evaporate the solvent or medium is carried out at least once. Thereby, a first layer is formed. A step of immersing the substrate in a solution, suspension or emulsion of the aforementioned positively-charged substance to carry out dip coating, or alternatively, applying the aforementioned solution, suspension or emulsion to the substrate by means of a spray, a roll, a brush, a sponge or the like, followed by drying is carried out at least once. Thereby, a second layer can also be formed.

In order to promote dispersion of the positively-charged substance or the negatively-charged substance in the layer, various surfactants or dispersants are preferably blended together with the positively-charged substance and the negatively-charged substance. The amount of the surfactants or dispersants may be from 0.001 to 1.0% by weight, and preferably from 0.1 to 1.0% by weight, with respect to the total amount of the positively-charged substance and the negatively-charged substance.

As the surfactants or dispersants, various organic silicon compounds can be employed. As the organic silicon compounds, various silane compounds, and various silicone oils, silicone gums, and silicone resins can be employed. One having an alkyl silicate structure or a polyether structure, or one having both an alkyl silicate structure and a polyether structure, in the molecule thereof, is preferable.

Here, the alkylsilicate structure refers to a structure in which alkyl groups are bonded to silicon atoms in the siloxane backbone. On the other hand, as examples of the polyether structure, mention may be made of molecular structures such as polyethylene oxide, polypropylene oxide, polytetramethylene oxide, a block copolymer of polyethylene oxide and polypropylene oxide, a copolymer of polyethylene and polytetramethylene glycol, or a copolymer of polytetramethylene glycol and polypropylene oxide, although there is no limitation thereto. Among these, a block copolymer of polyethylene oxide and polypropylene oxide is particularly suitable in view of the ability to control the wettability by the degree of blocking or the molecular weight.

An organic substance having both an alkylsilicate structure and a polyether structure in the molecule thereof is particularly preferable. Specifically, a polyether-modified silicone such as polyether-modified polydimethylsiloxane or the like is suitable. The polyether-modified silicone can be manufactured using a generally known method, for example, using the method described in Synthesis Example 1, 2, 3 or 4 in Japanese Unexamined Patent Application, First Publication No. H04-242499 or the Reference Example in Japanese Unexamined Patent Application, First Publication No. H09-165318. In particular, a polyethylene oxide-polypropylene oxide block copolymer-modified polydimethylsiloxane obtained by reacting a block copolymer of both-end methallyl polyethylene oxide-polypropylene oxide with dihydropolydimethylsiloxane is suitable.

Specifically, TSF4445 or TSF4446 (both manufactured by GE Toshiba Silicones Co., Ltd.), SH200 or SH3746M (both manufactured by Dow Corning Toray Silicone Co., Ltd.), KP series (manufactured by Shin-Etsu Chemical Co., Ltd.), DC3PA or ST869A (both manufactured by Dow Corning Toray Silicone Co., Ltd.), or the like can be employed. They are additives for paints, and can be employed as appropriate, as long as the aforementioned properties can be imparted.

The arrangement of the first layer and the second layer shown in FIG. 7 (a) can be obtained by the steps of spray-applying a mixture obtained by adding 0.01 to 1.0% by weight of a polyether-modified silicone to a dispersion of a conductor having negative charges such as a gold colloid, a silver colloid, a platinum colloid, a tin colloid or the like on the substrate, followed by drying, as well as, the steps of spray-applying a mixture obtained by adding 0.01 to 1.0% by weight of a polyether-modified silicone to a dispersion of a conductor having positive charges such as an iron ion, a zinc ion, a cobalt ion, a nickel ion, a copper ion or the like on the substrate, followed by drying.

If the aforementioned other components also constitute the substrate, the arrangement shown in FIG. 7 (a) can also be obtained by, for example, mixing a specified amount of the positively-charged substance, which has a higher specific gravity than that of a liquid to be cured of the substance forming the substrate, with the aforementioned liquid to be cured in a casting mold, subsequently allowing it to stand for a specified period, and subsequently mixing a specified amount of the negatively-charged substance, which has a higher specific gravity than that of the aforementioned liquid, followed by curing the aforementioned liquid.

In the first layer and/or the second layer, various additives such as an IR absorber or reflector, a UV absorber or reflector, and an electromagnetic wave shielding agent may be used. In this case, the amount of the additive is determined in consideration of the compatibility with the positively-charged substance or the negatively-charged substance.

FIG. 7 (b) shows a mode of forming an intermediate layer between the surface of the substrate and the first layer.

FIG. 7 (c) shows a mode of forming a coating layer on the surface of the second layer. In this case, due to electrostatic induction, the electric distribution which is the same as that of the second layer can be formed on the coating layer.

The intermediate layer and the coating layer can be formed from various types of organic or inorganic substances which can impart hydrophilic properties or hydrophobic properties or water-repellent properties or oil-repellent properties to the substrate.

As examples of hydrophilic organic substances, mention may be made of polyethers such as polyethylene glycol, polypropylene glycol, a block copolymer formed from polyethylene glycol and polypropylene glycol, and the like; polyvinyl alcohols; polyacrylic acids (including salts such as alkali metal salts, ammonium salts and the like), polymethacrylic acids (including salts such as alkali metal salts, ammonium salts and the like), or a copolymer formed from polyacrylic acid and polymethacrylic acid (including salts such as alkali metal salts, ammonium salts and the like); polyacrylamides; polyvinyl pyrrolidones; hydrophilic celluloses such as carboxymethylcellulose (CMC), methylcellulose (MC), and the like; natural hydrophilic polymer compounds such as polysaccharide and the like; and the like. Composite products formed by blending inorganic dielectrics such as silica, glass fibers, carbon fibers, and the like in the aforementioned polymer materials can also be employed. In addition, as the aforementioned polymer materials, paint materials can also be employed.

As examples of hydrophilic inorganic materials, mention may be made of, for example, $SiO_2$, and other silicon compounds.

As examples of water-repellent organic substances, mention may be made of polyolefins such as polyethylene, polypropylene, polystyrene, and the like; acrylic resins such as polyacrylate, acrylonitrile/styrene copolymer (AS), acrylonitrile/butadiene/styrene copolymer (ABS), and the like; polyacrylonitriles; polyhalogenated vinyls such as polyvinyl chloride, polyvinylidene chloride, and the like; fluorine resins such as polytetrafluoroethylene, fluoroethylene/propylene copolymer, polychlorotrifluoroethylene (PCTFE), polyvinylidene fluoride (PVDF), fluorinated vinylidene/trifluoroethylene copolymer, and the like; polyesters such as polyethylene terephthalate, polycarbonate, and the like; phenolic resins; urea resins; melamine resins; polyimide resins; polyamide resins such as nylon and the like; epoxy resins; polyurethanes; and the like.

As the water-repellent organic substances, fluorine resins are preferable, and in particular, fluorinated vinylidene/trifluoroethylene copolymers having strong dielectric properties and water-repellent properties, β-type crystals of polyvinylidene fluoride, and those containing the same are preferable. As the fluorine resins, commercially available products can be used. As examples of the commercially available products, mention may be made of, for example, HIREC 1550 manufactured by NTT-AT Co., Ltd., and the like.

In addition, a fluorine resin emulsion comprising a surfactant and at least one fluorine resin selected from the group consisting of copolymers formed from two or more types of olefins containing fluorine atoms, copolymers between olefins containing fluorine atoms and hydrocarbon monomers, and mixtures of copolymers formed from two or more types of olefins containing fluorine atoms and thermoplastic acrylic resins, as well as a curing agent (see Japanese Unexamined Patent Application, First Publication No. H05-124880; Japanese Unexamined Patent Application, First Publication No. H05-117578; and Japanese Unexamined Patent Application, First Publication No. H05-179191) and/or a composition comprising the aforementioned silicone resin-based water repellent (see Japanese Unexamined Patent Application, First Publication No. 2000-121543; and Japanese Unexamined Patent Application, First Publication No. 2003-26461) can also be employed. As the aforementioned fluorine resin emulsion, a commercially available product can be used, such as the ZEFFLE series available from Daikin Industries, Ltd., and the LUMIFLON series available from Asahi Glass Co., Ltd. As the aforementioned curing agent, a melamin-based curing agent, an amine-based curing agent, a polyvalent isocyanate-based curing agent, and a block polyvalent isocyanate-based curing agent are preferably employed.

As examples of water-repellent inorganic materials, mention may be made of, for example, silane-based, siliconate-based, silicone-based, or silane composite-based, or fluorine-based water-repellent agents or water absorption inhibitors, and the like. In particular, a fluorine-based water-repellent agent is preferable, and examples thereof include a fluorine-containing compound such as a compound containing a perfluoroalkyl group or the like, or a composition containing a fluorine-containing compound. When a fluorine-containing compound having increased adherence to the surface of the substrate is contained in the intermediate layer, after applying it to the surface of the substrate, it is not always necessary that the chemical components of the water repellent agent or the water-absorption inhibitor react with the substrate, and a chemical bond may be formed, or the chemical components may crosslink with each other.

The fluorine-containing compound which can be employed as the aforementioned fluorine-based water-repellent agent is preferably one containing a perfluoroalkyl group in a molecule and having a molecular weight ranging from 1,000 to 20,000. As examples thereof, mention may be made of perfluorosulfonate, perfluorosulfonic acid ammonium salt, perfluorocarboxylate, perfluoroalkyl betaine, perfluoroalkyl ethylene oxide adduct, perfluoroalkyl amine oxide, perfluoroalkyl phosphate, perfluoroalkyl trimethylammonium salt, and the like. Among these, perfluoroalkyl phosphate and perfluoroalkyl trimethylammonium salt are preferable since they exhibit superior properties of adhering to the surface of the substance. These materials are commercially available as SURFLON S-112 and SURFLON S-121 (both product names, manufactured by Seimi Chemical Co., Ltd.) and the like.

In the case of using a substrate having high water-absorbability, an intermediate layer containing a silane compound is preferably preliminarily formed on the substrate and below the first layer. The intermediate layer includes a large amount of Si—O bonds, and for this reason, it is possible to improve the strength of the first layer or the adhesiveness with the substrate. In addition, the aforementioned intermediate layer also exhibits a function of preventing moisture from seeping into the substrate.

Examples of the aforementioned silane compounds include a hydrolyzable silane, a hydrolysate thereof, and a mixture of these. As the hydrolyzable silane, various alkoxysilanes can be employed. Examples thereof include a tetraalkoxysilane, an alkyltrialkoxysilane, a dialkyldialkoxysilane, or a trialkylalkoxysilane. Among these, one type of hydrolyzable silane may be employed alone or two or more types of hydrolyzable silanes may be employed in combination. In addition, various organopolysiloxanes may be added to the aforementioned silane compounds. As an agent for forming an intermediate layer containing the silane compound, DRYSEAL S (manufactured by Dow Corning Toray Silicone Co., Ltd.) may be mentioned.

In addition, as the component for forming an intermediate layer, a silicone resin which is curable at room temperature, such as a methylsilicone resin, a methylphenylsilicone resin, or the like may be employed. As examples of a silicone resin which is curable at room temperature, mention may be made of AY42-170, SR2510, SR2406, SR2410, SR2405, and SR2411 (all manufactured by Dow Corning Toray Silicone Co., Ltd.).

The intermediate layer may be a paint film. As the paint material forming the paint film, a so-called paint containing a colorant and a synthetic resin such as an alkyd resin, an acrylic resin, an amino resin, a polyurethane resin, an epoxy resin, a silicone resin, a fluorine resin, an acrylic silicone resin, an unsaturated polyester resin, an ultraviolet-curable resin, a phenol resin, a vinyl chloride resin, or a synthetic resin emulsion can be preferably employed.

The thickness of the aforementioned paint film preferably ranges from 0.01 μm to 100 μm, more preferably ranges from 0.1 μm to 50 μm, and in particular, preferably ranges from 0.5 μm to 10 μm. In addition, as a method for painting, for example, a spray coating method, a dip coating method, a flow coating method, a spin coating method, a roll coating method, a brush coating method, a sponge coating method, or the like can be employed. In addition, in order to improve physical properties such as hardness of the paint film, adhesiveness with the substrate, and the like, heating is preferably carried out within a range acceptable for the substrate and the paint film.

Conventionally, protection of the surface of a substrate was carried out by coating the surface of the substrate with an organic or inorganic substance having superior water-repellent properties or oil-repellent properties, or hydrophilic properties or hydrophobic properties. However, the aforementioned organic or inorganic substance generally possesses negative charges. For this reason, there is a problem in that contaminants adhere to the surface over time and the protective properties thereof are remarkably impaired. In contrast, in the present invention, positive charges are imparted to the surface of the substrate, and for this reason, the problem described above can be eliminated. In addition, while the properties of the organic or inorganic substance are maintained, self-cleaning properties can be imparted, since the chemical properties of the surface of the substrate are not impaired.

Therefore, in the present invention, by utilizing the positive charges provided on the surface of the substrate, a product can be produced in which the functions of the substrate itself are exhibited, and at the same time, "functions of preventing contamination and preventing fogging" are exhibited. This technology can be applied to any substrate. In particular, by providing positive charges on the surface of an organic substance having superior water repellent properties or hydrophilic properties, the functions thereof can be maintained for a long time, and for this reason, application to a painted surface or a substrate formed from plastics is preferable. Thereby, "clean painted surfaces or plastics" can be provided.

A paint film releases decomposed products of the synthetic resin in the paint film or volatile substances such as organic solvent or the like used at the time of forming the paint film. As examples of volatile substances, mention may be made of, for example, alcohols such as methanol, ethanol, propanol, butanol, 1-methoxy-2-propanol, 2-methoxy-1-propanol, 2-methyl-1-propanol and the like; aromatic hydrocarbons such as benzene, toluene, xylene, ethylmethylbenzene, trimethylbenzene, diethylbenzene, dimethylethylbenzene, tetramethylbenzene and the like; aliphatic hydrocarbons such as pentane, hexane, 2,4-dimethylpentane, 2,3,4-trimethylpentane, 3,3-dimethylhexane, 2,2,5-trimethylhexane, cyclopentane, cyclohexane, decane, 2,2-dimethyldecane, dodecane and the like; oxides such as ethylene oxide, propylene oxide and the like; aldehydes such as formaldehyde, acetoaldehyde, 2-propynal, butanal and the like; ethers such as dimethyl ether, diethyl ether, methyl ethyl ether, methyl vinyl ether and the like; ketones such as acetone, 4-methyl-3-penten-2-one and the like; esters such as butyl formate and the like; paraffins and the like. Almost all of the aforementioned volatile substances are hydrophobic, and form negative charges (for example, alkoxide ion). Therefore, in the case of forming a paint film as the aforementioned intermediate layer, when the volatile substances generated from the aforementioned paint film under high-temperature conditions reach the second layer, the positive charges present in the second layer are compensated. As a result, the surface properties of the second layer change from hydrophilic properties to hydrophobic properties. Thereby, properties of preventing contamination are impaired.

However, in the present invention, the first layer possessing negative charges is present between the substrate and the second layer. For this reason, the aforementioned volatile substance never reaches the second layer by means of electrostatic repulsion. Alternatively, the volatile substance having negative charges passes through the first layer, and thereby, the charges are reversed. Therefore, the volatile substance never adheres to the second layer. Therefore, prevention of the positive charges of the second layer being neutralized and the protection function of the surface of the substrate be lost are possible.

The present invention can be utilized in any field in which various design properties and increased water resistance and contamination resistance are required. The present invention is suitably employed in many artificial materials utilized outside, such as building materials; outdoor air conditioners; kitchen instruments; hygiene instruments; lighting apparatuses; automobiles; bicycles; two-wheeled motor vehicles; airplanes; trains; boats and ships; or the like, or face panels of various machines, electronics, televisions, or the like, manufactured from glass, metals, ceramics, concrete, timber, stone materials, polymer resin covers, polymer resin sheets, fibers (clothes, curtains, and the like), sealants, or the like, or a combination thereof. In particular, the present invention is preferably employed in automobiles, airplanes and the like. Architectural structures such as houses, buildings, roads, tunnels, or the like, manufactured by employing the aforementioned building materials, can exhibit superior water resistance and contamination resistance effects over time. In particular, the present invention can be effectively used in prevention of contaminants of bodies and tire wheels of automobiles.

EXAMPLES

Hereafter, the present invention will be illustrated in detail by examples. However, it should be understood that the present invention is not limited to the examples.
Test Liquid 1

0.297 g of $SnCl_2/2H_2O$ (tin (II) chloride) was completely dissolved into 500 ml of pure water. To the aforementioned solution, 5.0 g of a 50% solution of titanium (IV) tetrachloride (manufactured by Sumitomo Sticks Co., Ltd.) was added, and pure water was further added until the solution reached 500 ml. Aqueous ammonia which had been prepared by 10 times dilution of 25% aqueous ammonia (manufactured by Takasugi Pharmaceutical Co., Ltd.) was added dropwise thereto in order to adjust the pH thereof to 7.0. Thereby, a mixture of tin hydroxide and titanium hydroxide was precipitated. The precipitate was washed with pure water until the conductivity of the supernatant fluid became 0.8 mS/m or less. Washing was ended when the conductivity became 0.713 mS/m. Thereby, 317 g of hydroxides with a concentration of 0.48% by weight was obtained. Subsequently, the aforementioned liquid was cooled to between 1 and 5° C., and was stirred for 16 hours after adding 28 g of 35% aqueous solution of hydrogen peroxide (manufactured by Taiki Yakuhin Kogyo Co., Ltd.) thereto. Thereby, 345 g of a clear yellowish brown solution of tin-doped amorphous titanium peroxide with a concentration of 0.51% by weight was obtained. This solution was used as Test Liquid 1.
Test Liquid 2

0.463 g of 97% $CuCl_2/2H_2O$ (manufactured by Nihon Kagaku Sangyo Co., Ltd.) was completely dissolved into 500 ml of pure water. To the aforementioned solution, 10 g of a 50% solution of titanium (IV) tetrachloride (manufactured by Sumitomo Sticks Co., Ltd.) was added, and pure water was further added until the solution reached 1,000 ml. Aqueous ammonia which had been prepared by 10 times dilution of 25% aqueous ammonia (manufactured by Takasugi Pharmaceutical Co., Ltd.) was added dropwise thereto in order to adjust the pH thereof to 7.0. Thereby, a mixture of copper hydroxide and titanium hydroxide was precipitated. The precipitate was washed with pure water until the conductivity of the supernatant fluid became 0.8 mS/m or less. Washing was ended when the conductivity became 0.8 mS/m. Thereby, 340 g of hydroxides with a concentration of 0.81% by weight was obtained. Subsequently, the aforementioned liquid was cooled to between 1 and 5° C., and was stirred for 16 hours after adding 25 g of a 35% aqueous solution of hydrogen peroxide (manufactured by Taiki Yakuhin Kogyo Co., Ltd.). Thereby, 365 g of a clear green dispersion of copper-doped amorphous titanium peroxide with a concentration of 0.90% by weight was obtained. By diluting the aforementioned dispersion with pure water, 385 g of a dispersion of copper-doped amorphous titanium peroxide with a concentration of 0.85% by weight was prepared. The aforementioned dispersion was used as Test Liquid 2.

Test Liquid 3

0.712 g of $FeCl_3/6H_2O$ was completely dissolved into 500 ml of pure water. To the aforementioned solution, 10 g of a 50% solution of titanium (IV) tetrachloride (manufactured by Sumitomo Sticks Co., Ltd.) was added, and pure water was further added until the solution reached 1,000 ml. Aqueous ammonia which had been prepared by 10 times dilution of 25% aqueous ammonia (manufactured by Takasugi Pharmaceutical Co., Ltd.) was added dropwise thereto in order to adjust the pH thereof to 7.0. Thereby, a mixture of iron hydroxide and titanium hydroxide was precipitated. The precipitate was washed with pure water until the conductivity of the supernatant fluid became 0.8 mS/m or less. Washing was ended when the conductivity became 0.744 mS/m. Thereby, 420 g of a hydroxides-containing liquid with a concentration of 0.47% by weight was obtained. Subsequently, the aforementioned liquid was cooled to between 1 and 5° C., and was stirred for 16 hours after adding 25 g of a 35% aqueous solution of hydrogen peroxide (manufactured by Taiki Yakuhin Kogyo Co., Ltd.). Thereby, 440 g of a clear deep yellow brown dispersion of iron-doped amorphous titanium peroxide with a concentration of 0.44% by weight was obtained. By concentrating the aforementioned dispersion with an ultrafiltration concentrator, 220 g of the dispersion with a concentration of 0.85% by weight was prepared. The prepared dispersion was mixed with Test Liquid 2 in a ratio of 1:2, and thereby, Test Liquid 3 was prepared.

Test Liquid 4

20 g of a 50% solution of titanium (IV) tetrachloride (manufactured by Sumitomo Sticks Co., Ltd.) was added to 1,000 g of pure water, and pure water was further added until the solution reached 2,000 g. Aqueous ammonia which had been prepared by 10 times dilution of 25% aqueous ammonia (manufactured by Takasugi Pharmaceutical Co., Ltd.) was added dropwise thereto in order to adjust the pH thereof to 7.0. Thereby, a mixture of titanium hydroxides was precipitated. The precipitate was washed with pure water until the conductivity of the supernatant fluid became 0.8 mS/m or less. Washing was ended when the conductivity became 0.738 mS/m. Thereby, 860 g of hydroxide with a solid content concentration of 0.73% by weight was obtained. Subsequently, the obtained liquid was cooled to between 1 and 5° C., and was stirred for 16 hours after adding 50 g of a 35% aqueous solution of hydrogen peroxide (manufactured by Taiki Yakuhin Kogyo Co., Ltd.). Thereby, 905 g of a clear pale yellow brown dispersion of amorphous titanium peroxide with a solid content concentration of 0.86% by weight was obtained. 100 g of the aforementioned amorphous titanium peroxide dispersion was collected, 2.0 g of an aqueous solution of silver nitrate adjusted to be 0.05 mole/liter was added thereto, and the mixture was stirred. Thereby, 102 g of a clear yellow amorphous dispersion of titanium peroxide in which silver nitrate was dispersed was prepared. The prepared dispersion was mixed with Test Liquid 2 in a ratio of 1:2. Thereby, the mixed liquid was used as Test Liquid 4.

Preparation of Test Substrates 1 to 4 and Comparative Test Substrates 1 to 4

A layer structure shown in Table 1 described below was formed on a commercially available polycarbonate plate (60 mm×110 mm; thickness=2.8 mm) by means of a spray application method. More particularly, in the case of a single layer, an amount of 12 g/m² was applied; and in the case of a double layer, an amount of 8 g/m² was applied as the first layer, and an amount of 12 g/m² was applied as the second layer, followed by natural drying. Exposure thereon for one minute at a surface temperature of 150° C. by means of a 400 W high-pressure mercury lamp was carried out to form layers. Thereby, Test Substrates 1 to 4 and Comparative Test Substrates 1 to 4 were prepared. In each of the test liquids, Z-B (manufactured by Sustainable Titania Technology Inc.) was added in a weight ratio of 10:2 as an organosilicon compound (surfactant).

TABLE 1

| | | | |
|---|---|---|---|
| Double layer | Test Substrate 1 | First layer: Test Liquid 1 (negatively charged) | Second layer: Test Liquid 2 (positively charged) |
| | Test Substrate 2 | First layer: Test Liquid 1 (negatively charged) | Second layer: Test Liquid 3 (positively charged) |
| | Test Substrate 3 | First layer: Test Liquid 1 (negatively charged) | Second layer: Test Liquid 4 (positively and negatively charged) |
| | Test Substrate 4 (Control) | First layer: Test Liquid 2 (positively charged) | Second layer: Test Liquid 1 (negatively charged) |
| Single layer | Comparative Test Substrate 1 | Test Liquid 1 (negatively charged) | |
| | Comparative Test Substrate 2 | Test Liquid 2 (positively charged) | |
| | Comparative Test Substrate 3 | Test Liquid 3 (positively charged) | |
| | Comparative Test Substrate 4 | Test Liquid 4 (positively and negatively charged) | |

Evaluation 1: Surface Charge Properties

The static electricity on each substrate was removed by an electrostatic removal blower (SJ-F020: manufactured by Keyence Corporation), and each substrate was placed on an SUS earthed plate such that the distance from an electrostatic sensor (SK: manufactured by Keyence Corporation) was 5 mm. The electrostatic voltage on the surface of the substrate was measured three times under the conditions of an air temperature of 30° C., humidity of 65% and −50 V of floating electric ions, and the average thereof was regarded as the measured value. The results are shown in Table 2.

TABLE 2

| | Test Substrate 1 | Test Substrate 2 | Test Substrate 3 | Test Substrate 4 | Comparative Test Substrate 1 | Comparative Test Substrate 2 | Comparative Test Substrate 3 | Comparative Test Substrate 4 |
|---|---|---|---|---|---|---|---|---|
| Electrostatic voltage: V | +210 | +248 | +42 | −205 | −218 | +185 | +200 | +27 |

Evaluation 2: Surface Hydrophilic Properties

The surface of the formed layer of each of Test Substrates 1 to 4 and Comparative Test Substrates 1 to 4 was treated in the procedures described below. One drop of pure water was dripped by means of a dropper from a height of about 10 mm thereonto. Subsequently, visual observation of the contact angle formed by the dripped aqueous droplet was carried out by means of a protractor meter. The results are shown in Table 3.

TABLE 3

| | After 400 W UV treatment for one minute at 150° C. | After running water treatment for 10 seconds and pure water treatment for 3 seconds | After heat treatment for 3 hours at 130° C. | After running water treatment for 10 seconds and pure water treatment for 3 seconds | After 400 W UV treatment for one minute at 150° C. |
|---|---|---|---|---|---|
| Test Substrate 1 | 10° | 10°> | 35° | 30° | 15° |
| Test Substrate 2 | 10° | 10° | 45° | 40° | 20° |
| Test Substrate 3 | 10° | 10° | 50° | 40° | 25° |
| Test Substrate 4 | 40° | 45° | 80° | 70° | 70° |
| Comparative Test Substrate 1 | 40° | 35° | 75° | 80° | 75° |
| Comparative Test Substrate 2 | 50° | 40° | 80° | 75° | 75° |
| Comparative Test Substrate 3 | 45° | 40° | 75° | 70° | 70° |
| Comparative Test Substrate 4 | 50° | 45° | 60° | 65° | 60° |

Table 2 shows the charge properties of the surface of each of the substrates. From the results shown in Table 3, it can be seen that change in hydrophilic properties of the surface when the treatments with UV, running water, heating for a long time or the like is reduced in the order described below: Test Substrate 1>Test Substrate 2>Test Substrate 3>Test Substrate 4.

Therefore, the layer structure in which the first layer from the substrate side possesses negative charges and the second layer possesses positive charges or positive and negative charges contributes to hydrophilic properties. In all cases of the single layer, the contact angle formed by the dripped aqueous droplet ranges from 40° to 80° (hydrophobic properties to water repellent properties). Therefore, it can be seen that the single layer structure exhibits poor properties of preventing contaminants.

Reference 1: Confirmation Test of Reducing Surface Properties

A base paint for aluminum wheels (manufactured by Kansai Paint Co., Ltd.) and a clear paint (manufactured by Kansai Paint Co., Ltd.) were independently applied to an aluminum plate (A 1050 P), followed by baking for 20 minutes at 140° C. Subsequently, Test Liquid 3 was applied thereto so that a thickness of about 0.1 µm was obtained, followed by UV drying. Thereby, Test Substrate 5 was obtained.

Figure 8:
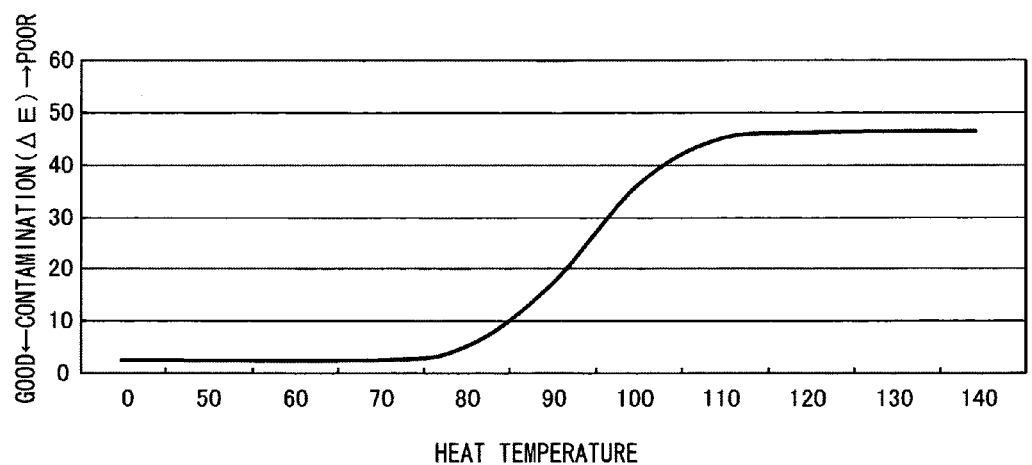
FIG. 8 is a graph showing test results of Reference 1.

Test Substrate 5 was heated in an electric furnace for 20 minutes at a level ranging from 50° C. to 140° C. Subsequently, a brake contamination acceleration test corresponding to 3,200 km was carried out. The color difference (ΔE) between the contaminated surface and the initial surface was used as the contamination property. The results are shown in FIG. 8. It can be seen that when the heating temperature exceeds 80° C., effects of preventing contaminants are reduced (the contamination property, ΔE increases). In accordance with increasing the temperature, a negatively-charged gas generates from the paint film for aluminum wheels, and then adheres to the positively-charged layer. This is believed as a factor of reduction of effects of preventing contaminants.

Reference 2: Analysis of Negatively Charged Gas

A base paint for aluminum wheels (manufactured by Kansai Paint Co., Ltd.) and a clear paint (manufactured by Kansai Paint Co., Ltd.) were independently applied to a polypropylene plate, followed by baking for 20 minutes at 140° C. Subsequently, the formed coating film was peeled from the polypropylene plate, and a sample in the form of a film was prepared. Three samples (50 µm) were placed in a vial container, and heated for one hour at 120° C. Subsequently, a gas was collected in a gas collection bottle, and analysis thereof was carried out by means of TMDGC/MS. As a result of the analysis, the main component of the gas generated from the base paint for aluminum wheels and the clear paint was butanol. In addition thereto, as the gases in trace amounts, 1-methoxy-2-propanol (detected only from the base paint), alcohol-based product and aromatic/aliphatic hydrocarbons were detected.

Evaluation 3: Effects of Preventing Surface Contamination

A base paint for aluminum wheels (manufactured by Kansai Paint Co., Ltd.) and a clear paint (manufactured by Kansai Paint Co., Ltd.) were independently applied to an aluminum plate, followed by baking for 20 minutes at 140° C. Subsequently, three types of Test Substrates A to C described below were prepared.

A: as it was;

B: Test Liquid 3 was applied thereto so that a thickness of about 0.1 µm was obtained, followed by UV drying; and C: Test Liquid 1 was applied to the first layer, and Test Liquid 3 was applied to the second layer so that a thickness of about 0.05 µm was obtained in each case, followed by UV drying.

Figure 9:
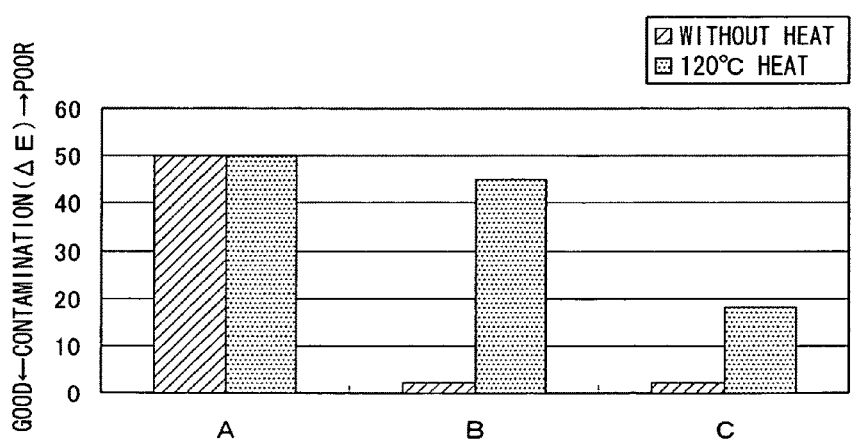
FIG. 9 is a graph showing test results of Evaluation 3.

Test Substrates A to C were independently used as they were, or alternatively heated for 20 minutes at 120° C. Subsequently, a brake contamination acceleration test corresponding to 3,200 km was carried out thereon. The color difference (ΔE) between the contaminated surface and the initial surface was used as a contamination property. The results are shown in FIG. 9 and FIG. 10. It can be seen that Test Substrate C in which a negatively-charged substance was arranged in the first layer and a positively-charged substance was further arranged thereon controlled the reduction of performance of preventing contaminants (increasing of the property of preventing contaminants, ΔE was reduced), with respect to Test Substrate B in which only positively-charged substance was present on the surface.

Preparation of Test Substrates 6 to 8 and Comparative Test Substrates 5 and 6

A base paint for aluminum wheels (manufactured by Kansai Paint Co., Ltd.) and a clear paint (manufactured by Kansai Paint Co., Ltd.) were independently applied to an aluminum plate (A 1050 P), followed by baking for 20 minutes at 140° C. Subsequently, Test Liquid 1 was applied thereto so that a thickness of about 0.1 μm was obtained, followed by UV drying. Subsequently, the operations described below were further carried out. Thereby, Test Substrates 6 to 8 and Comparative Test Substrates 5 and 6 were prepared.

Test Substrate 6

An aqueous dispersion of titania for imparting positive charges (Z18-1000 nA, manufactured by Sustainable Titania Technology Inc.) was applied to the aforementioned substrate so that a thickness of about 0.1 was obtained, followed by drying under heating. Thereby, Test Substrate 6 was prepared.

Test Substrate 7

A mixture of an aqueous dispersion of titania for imparting positive charges (Z18-1000 nA, manufactured by Sustainable Titania Technology Inc.) and an aqueous dispersion of anatase-type titania for photocatalyst (SAS170, manufactured by Sustainable Titania Technology Inc.) in the ratio of 9:1 was applied to the aforementioned substrate so that a thickness of about 0.1 was obtained, followed by drying under heating. Thereby, Test Substrate 7 was prepared.

Test Substrate 8

A mixture of an aqueous dispersion of titania for imparting positive charges (Z18-1000 nA, manufactured by Sustainable Titania Technology Inc.) and an aqueous dispersion of anatase-type titania for photocatalyst (SAS170, manufactured by Sustainable Titania Technology Inc.) in the ratio of 9:3 was applied to the aforementioned substrate so that a thickness of about 0.1 μm was obtained, followed by drying under heating. Thereby, Test Substrate 8 was prepared.

Comparative Test Substrate 5

An aluminum plate (A 1050 P) itself was used as Comparative Test Substrate 5.

Comparative Test Substrate 6

Only an aqueous dispersion of anatase-type titania for photocatalyst (SAS170, manufactured by Sustainable Titania Technology Inc.) was applied to an aluminum plate (A 1050 P) so that a thickness of about 0.1 μm was obtained, followed by drying. Thereby, Comparative Test Substrate 6 was obtained.

Evaluation 4: Surface Charge Properties

A commercially available red ink (manufactured by The Pilot Ink Co., Ltd.) containing a dye with negative charges represented by the following formula:

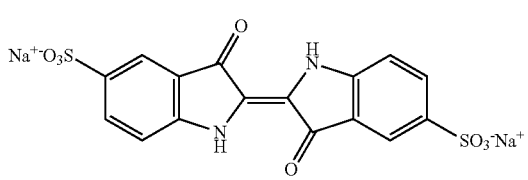

was diluted by a factor of 10 with ethanol. The diluted ink was applied to the surface of each of Test Substrates 6 to 8 and Comparative Test Substrates 5 and 6 in a ratio of 0.007 g/100 cm², followed by UV drying. The test substrate was subjected to ultraviolet irradiation under a 20 W black light with an intensity of 1,000 μW/cm². The fading rate of the red ink was measured by means of a colorimeter (CR-200, manufactured by Minolta).

The fading rate (%) of the red ink was calculated by means of the following equation. The results are shown in Table 4.

$$\text{Fading rate} = 100 - \{\sqrt{((L_2-L_0)^2+(a_2-a_0)^2+(b_2-b_0)^2))}/\sqrt{((L_1-L_0)^2+(a_1-a_0)^2+(b_1-b_0)^2))}\}*100$$

wherein $L_0, a_0, b_0$: colorimetric value of each of the substrates before the red ink was applied (based on a CIELAB color space, hereinafter, the same base was applied);

$L_1, a_1, b_1$: colorimetric value of each of the substrates immediately after the red ink was applied (before ultraviolet irradiation); and $L_2, a_2, b_2$: colorimetric value of each of the substrates after ultraviolet irradiation.

TABLE 4

| | | Period of UV irradiation | | | | | |
|---|---|---|---|---|---|---|---|
| | | 0 | 16.50 | 40.50 | 73.05 | 121.55 | 139.15 |
| Fading Rate | Test Substrate 6 | 0 | 21.4 | 35.8 | 64.1 | 79.4 | 80.8 |
| | Test Substrate 7 | 0 | 25.1 | 47.2 | 73.0 | 85.2 | 86.0 |
| | Test Substrate 8 | 0 | 47.1 | 83.0 | 89.8 | 91.8 | 91.9 |
| | Comparative Test Substrate 5 | 0 | 80.1 | 96.2 | 97.8 | 98.7 | 98.5 |
| | Comparative Test Substrate 6 | 0 | 93.6 | 97.8 | 98.2 | 98.3 | 98.4 |

From the results shown in Table 4, it can be seen that Test Substrate 6 having positive charges on the surface thereof most adsorbs the negatively-charged dye, and exhibits reduced oxidation degradation caused by UV exposure; and in contrast, Comparative Test Substrate 5 and Comparative Test Substrate 6 electrostatically repel the negatively-charged dye, and at the same time, exhibit increased oxidation degradation (decomposition) by UV exposure. Test Substrate 7 and Test Substrate 8 exhibit properties which are intermediate between these, and exhibit surface properties of both positive charges and negative charges.

Evaluation 5: Surface Hydrophilic Properties

Test Substrates 6 to 8 and Comparative Test Substrates 5 and 6 were allowed to be exposed outdoors (clear weather in the daytime) for 24 hours. Subsequently, one drop of pure water was dripped by means of a dropper from a height of about 10 mm thereonto. Subsequently, visual observation of the contact angle formed by the dripped aqueous droplet was carried out by means of a protractor meter. The results are shown in Table 5.

TABLE 5

| | After exposure for 24 hours |
|---|---|
| Test Substrate 6 | 20° |
| Test Substrate 7 | 10°> |
| Test Substrate 8 | 10°> |
| Comparative Test Substrate 5 | 70° |
| Comparative Test Substrate 6 | 15° |

From Table 5, it can be seen that Test Substrates 7 and 8 possessing both positive charges and negative charges exhibit superior hydrophilic properties.

Evaluation 6: Evaluation of Preventing Contaminants

An aqueous dispersion of carbon black (FW-200: manufactured by Nippon Paint Industrial Coating Co., Ltd.) was diluted with pure water to obtain a 5% dilution. The dilution was applied to the surface of each of Test Substrates 6 to 8 and Comparative Test Substrates 5 and 6 in a ratio of 0.09 g/100 cm$^2$, followed by drying under heating for 30 minutes at 80° C. When the test substrate was cooled to room temperature, ion water was dispersed from the position at a distance of 10 cm under pressure of 0.4 MPa. The rate of reducing carbon black (possessing positive charges or possessing both positive charges and negative charges) of the surface of each test substrate was measured by means of a colorimeter (CR-200, manufactured by Minolta).

The rate (%) of reducing carbon black was calculated by means of the following equation. The results are shown in Table 6.

$$\text{Rate of reducing carbon black} = 100 - \{\sqrt{((L_2-L_0)^2+(a_2-a_0)^2+(b_2-b_0)^2)}/\sqrt{((L_1-L_0)^2+(a_1-a_0)_2+(b_1-b_0)^2)}\} * 100$$

wherein $L_0$, $a_0$, $b_0$: colorimetric value of each of the substrates before the carbon black was applied;
$L_1$, $a_1$, $b_1$: colorimetric value of each of the substrates immediately after the carbon black was applied (before water was dispersed); and
$L_2$, $a_2$, $b_2$: colorimetric value of each of the substrates after water was dispersed.

TABLE 6

|  | After application of 5% FW-200 dispersion | After dispersion of ion water under pressure of 0.4 MPa | Rate of reducing carbon black (decoloration rate) % |
| --- | --- | --- | --- |
| Test Substrate 6 | 7.90 | 0.58 | 92.6 |
| Test Substrate 7 | 9.84 | 1.11 | 88.5 |
| Test Substrate 8 | 8.43 | 0.88 | 89.5 |
| Comparative Test Substrate 5 | 10.29 | 8.41 | 17.8 |
| Comparative Test Substrate 6 | 8.26 | 1.65 | 79.5 |

From Table 6, the order of the rate of reducing carbon black (%) was Test Substrate 6 (positively charged)>Test Substrate 8 (positively and negatively charged)>Test Substrate 7 (positively and negatively charged)>Comparative Test Substrate 6>Comparative Test Substrate 5. Therefore, it can be seen that Test Substrate 6 possessing positive charges on the surface thereof and Test Substrates 7 and 8 possessing both positive charges and negative charges on the surface thereof exhibit superior effects of preventing contaminants.

The invention claimed is:

1. A substrate of which contamination of a surface is prevented or reduced, of which a surface is protected, or of which a surface is made hydrophilic, characterized by arranging successively in relation to the substrate:
    an electrostatically negatively charged first layer containing a negatively-charged substance; an intermediate layer formed between said substrate and said first layer; and
    an electrostatically positively charged second layer containing a positively-charged substance or containing a positively-charged substance and a negatively-charged substance, on the surface of the substrate or in a surface layer of the substrate,
    wherein said positively-charged substance is at least one substance having positive charges selected from the group consisting of (1) a positive ion of a metal selected from the group consisting of alkaline metal, alkaline earth metal, cobalt, nickel, iron, copper, manganese, zirconium, and zinc; (2) a conductor or dielectric having positive charges; and (3) a composite formed from a conductor having positive charges and a dielectric or a semiconductor,
    wherein the substrate has negative charges, and a negatively-charged substance produced from the intermediate layer is changed to a positively-charged substance due to the electrostatically negatively charged first layer, or a negatively-charged substance produced from the intermediate layer does not reach the second layer due to the electrostatic repulsion caused by the first layer,
    wherein the electrostatically positively charged second layer is not neutralized by the negatively-charged substance, and
    wherein a surface protective function of the electrostatically positively charged second layer is not impaired.

2. The substrate according to claim 1, wherein a coating layer is formed on said second layer.

3. A tire wheel for use in an automobile comprising the substrate as recited in claim 1.

4. The substrate according to claim 1 wherein said negatively-charged substance is at least one substance having negative charges selected from the group consisting of (1) a negative ion; (2) a conductor or dielectric having negative charges; (3) a composite formed from a conductor having negative charges and a dielectric or a semiconductor; and (4) a substance having photocatalytic function.

* * * * *

UNITED STATES PATENT AND TRADEMARK OFFICE
CERTIFICATE OF CORRECTION

PATENT NO. : 8,906,298 B2  
APPLICATION NO. : 12/736418  
DATED : December 9, 2014  
INVENTOR(S) : Keiji Koike et al.

Page 1 of 1

It is certified that error appears in the above-identified patent and that said Letters Patent is hereby corrected as shown below:

In the Specification,

Column 4, line 60, change "hydroxyl radicals (.OH)" to -- hydroxyl radicals (·OH) --;

Column 9, lines 1-3, change "As the semiconductor for the composite employed in the present invention, for example, C, Si, Ge, Sn, GaAs, Inp, GeN, ZnSe, PbSnTe, or the like, can be employed," to -- As the semiconductor for the composite employed in the present invention, for example, C, Si, Ge, Sn, GaAs, InP, GeN, ZnSe, PbSnTe, or the like, can be employed, --;

Column 25, lines 15-17, change "Rate of reducing carbon black = $100-\{\sqrt{((L_2-L_0)^2 + (a_2-a_0)^2 + (b_2-b_0)^2))}/\sqrt{((L_1-L_0)^2 + (a_1-a_0)_2 + (b_1-b_0)^2))}\}*100$" to -- Rate of reducing carbon black = $100-\{\sqrt{((L_2-L_0)^2 + (a_2-a_0)^2 + (b_2-b_0)^2))}/\sqrt{((L_1-L_0)^2 + (a_1-a_0)^2 + (b_1-b_0)^2))}\}* 100$ --.

Signed and Sealed this  
Twenty-second Day of September, 2015

Michelle K. Lee  
*Director of the United States Patent and Trademark Office*